UNITED STATES PATENT OFFICE.

JANNY GÖPPER AND OTTO GEIGER, OF OBERTURKHEIM, GERMANY.

PROCESS FOR MAKING A VISCOUS, STRINGY, ADHESIVE SUBSTANCE.

1,063,870.  Specification of Letters Patent.  Patented June 3, 1913.

No Drawing.  Application filed May 21, 1912. Serial No. 698,675.

*To all whom it may concern:*

Be it known that we, JANNY GÖPPER and OTTO GEIGER, subjects of the Emperor of Germany, residing at Oberturkheim, in the Kingdom of Wurttemberg, Germany, have invented certain new and useful Improvements in Processes for Making Viscous, Stringy, Adhesive Substances, of which the following is a description.

Although the processes for making viscous, stringy, substances, such as are employed more particularly in the asphalt industry, and branches allied thereto, have given good results, they are in so far useless for practical working as they are somewhat complicated and protracted, and are consequently expensive to carry out, so that they have not been largely adopted. Now the process according to this invention avoids these disadvantages, and is characterized by its being extraordinarily simple and in this way substantially reduces the cost of making the product. In contrast to the known processes, in this improved process only two initial materials are used, namely, the resin already known for the intended object (or any suitable resinous products) and sulfuric acid.

In practical working the process is preferably carried out in the following way:— Resin or resinous products are first melted and heated to a temperature of 200° C. At this temperature about 20–30% of sulfuric acid is added to the melted resin, whereupon a violent reaction takes place which, however, gradually becomes weaker. Up to this stage the process occupies about one hour. The molten mass is then allowed to cool to 80°, and as acid in excess is still present, a suitable quantity of soda lye is added, which is preferably so calculated that there may not be too large an excess, because otherwise saponification would take place and the result of the entire process be thereby endangered. Experience has shown that generally 10% of soda lye should be added. The entire process is then completed.

The product made according to this process is of a viscous, adhesive, stringy constituency and is particularly adapted as an addition to tar varnishes, bitumen in wood block paving, and so forth.

Having thus described our invention, what we claim as new and desire to secure by Letters Patent, is:—

1. The herein described process for making a viscous, sticky or adhesive stringy substance from resinous substances for use in the asphalt industry and the like, which consists in heating the resinous substances with sulfuric acid and then adding thereto a substance for neutralizing the acid excess.

2. The herein described process for making a viscous, sticky or adhesive stringy substance from resinous substances for use in the asphalt industry and the like, which consists in heating the resinous substances with sulfuric acid to about 200° C. for a suitable time, then cooling and then adding thereto a suitable quantity of soda lye to neutralize the acid in excess.

In testimony whereof, we affix our signatures, in the presence of two witnesses.

JANNY GÖPPER.
OTTO GEIGER.

Witnesses:
  WALTER SCHWEIBECH,
  RUDOLF BRECHT.